United States Patent [19]
Taft et al.

[11] 3,871,678
[45] Mar. 18, 1975

[54] SUSPENSION UNITS FOR VEHICLES

[75] Inventors: Philip Augustus Taft; Stuart Bruce Dawson, both of Solihull, England

[73] Assignee: Girling Limited, Birmingham, England

[22] Filed: Nov. 15, 1973

[21] Appl. No.: 416,204

[30] Foreign Application Priority Data
Dec. 2, 1972 United Kingdom............... 55776/72
Apr. 5, 1973 United Kingdom............... 16235/73

[52] U.S. Cl............................. 280/124 F, 267/64 B
[51] Int. Cl............................................. B60g 11/28
[58] Field of Search...... 280/124 F; 267/64 R, 64 B, 267/65 R, 65 D; 188/322; 92/85

[56] References Cited
UNITED STATES PATENTS
3,625,540 12/1971 Jewell............................ 280/124 F
3,788,628 1/1974 Hotz................................ 267/65 R
3,797,366 3/1974 Hanes.............................. 188/332

*Primary Examiner*—Philip Goodman
*Assistant Examiner*—John A. Carroll
*Attorney, Agent, or Firm*—Scrivener Parker Scrivener and Clarke

[57] ABSTRACT

In a self-levelling hydro-pneumatic suspension unit for a vehicle operation of an inlet valve controlling liquid flow into the unit through an inlet is controlled by resilient means in association with an assembly comprising a piston working in a cylinder and a piston-rod carrying the piston.

10 Claims, 4 Drawing Figures

SUSPENSION UNITS FOR VEHICLES

This invention relates to a new or improved hydro-pneumatic suspension unit for vehicles of the kind in which the load on a wheel or axle is supported by air or gas in a pressure chamber of which the effective volume is variable in accordance with the load, and means are incorporated for automatically maintaining the effective length of the unit at a predetermined value, irrespective of the load.

In an hydro-pneumatic suspension unit of the kind set forth the pressure chamber may be combined with the unit or may comprise a separate assembly connected to the unit by an external connection.

According to one aspect of our invention a hydro-pneumatic suspension unit of the kind set forth comprises a cylinder, a piston-rod assembly comprising a piston adapted to work in the cylinder and a piston-rod carrying the piston and adapted to work through a closure for one end of the cylinder, and inlet in the unit for connection to a source of high pressure liquid, an inlet valve for controlling liquid flow through the inlet into the unit, and resilient means acting in association with the assembly to control operation of the inlet valve.

Conveniently the resilient means is incorporated in a telescopic assembly constructed and arranged to affect operation of the inlet valve when the effective length of the unit attains a predetermined value.

Normally the inlet valve is open and is closed by the resilient means when the effective length of the unit attains a predetermined value.

Preferably the resilient means comprises a compression spring adapted to urge the piston in a direction opposite to that in which the piston is adapted to be urged by liquid under pressure, at least through a limited range, and the spring is combined with the telescopic sub-assembly which surrounds the piston rod, one end of the sub-assembly acting on the face of the piston adjacent to the closure for the said one end of the cylinder, and the other end of the sub-assembly being adapted to act on the closure when the effective length of the unit exceeds the predetermined value, further movement of the piston towards the closure in the same direction being operative to contract the sub-assembly and compress the spring to close the inlet valve.

In one construction the telescopic sub-assembly comprises first and second sleeves provided at adjacent ends with radial flanges which abut when the sub-assembly is fully extended. Thus, the length by which the unit can extend before the inlet valve is closed is limited by the extended length of the sub-assembly and similarly the effective contracted length of the unit is determined by the contracted length of the sub-assembly, namely the effective length of the longer of the sleeves.

It is desirable to increase the range of the effective length of the unit during which the inlet valve remains closed to delay the effects of pressuring the unit and exhausting the unit to reservoir during excessive oscillations of the unit, for example when a vehicle in which it is incorporated is negotiating a tight curve in one direction followed by a tight curve in the opposite direction as experienced in negotiating a chicane.

This is achieved in a modified construction in which the sub-assembly in which the spring is incorporated comprises at least three telescopic sleeves provided at adjacent ends with radial flanges which abut when the sub-assembly is fully extended.

The effective fully extended length of the telescopic sub-assembly is substantially the same as that of the two part sub-assembly. However, the fully contracted length of the telescopic sub-assembly defined by the length of the longest sleeve it therefore reduced, and the range over which the inlet valve remains closed is increased substantially.

Conveniently the valve is incorporated in the closure for the said one end of the cylinder and is closed by engagement therewith of the end of the sub-assembly remote from the piston.

The valve may be of the needle-type comprising a valve member working in a blind bore in the closure and engagable with a seating adjacent to the inner end of the bore which is defined by a passage for connection to the source.

The piston-rod may work through a single seal in the closure comprising the only seal in the unit adapted to be subjected to pressure of liquid from the source.

Preferably the high pressure seal is constructed from polytetrafluroethelyne (P.T.F.E.) to reduce to a minimum sliding friction with the piston rod.

The piston-rod is provided with a radial port in communication with one end of an axial bore in the rod of which the opposite end communicates with a complementary axial bore passing through the piston. Normally the radial port is located on the high pressure side of the seal but, when the unit is extended below the predetermined value and the valve is closed, the port is disposed on the opposite low pressure side of the seal to exhaust the high pressure liquid from the unit thereby restoring its effective length to the predetermined value.

When the radial port passes the seal, the pressure at the port balances the pressure acting on the seal with the result that the seal is not forced onto the port. This increases substantially the life of the seal.

Two embodiments of our invention are illustrated in the accompanying drawings in which.

Figure 1:
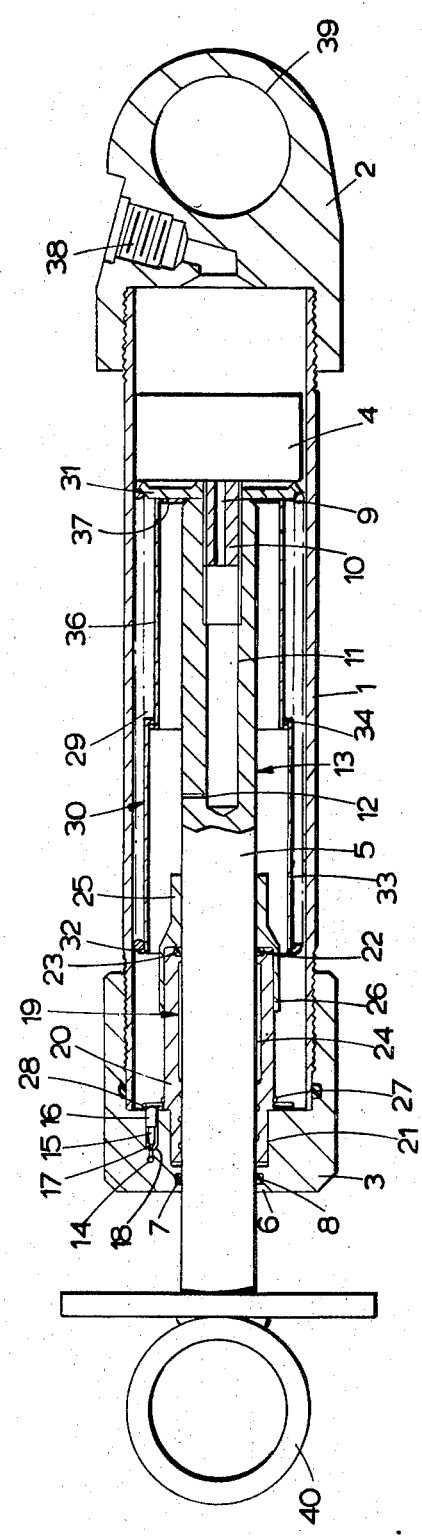
FIG. 1 is a longitudinal section through an hydro-pneumatic suspension unit.
Figure 2:
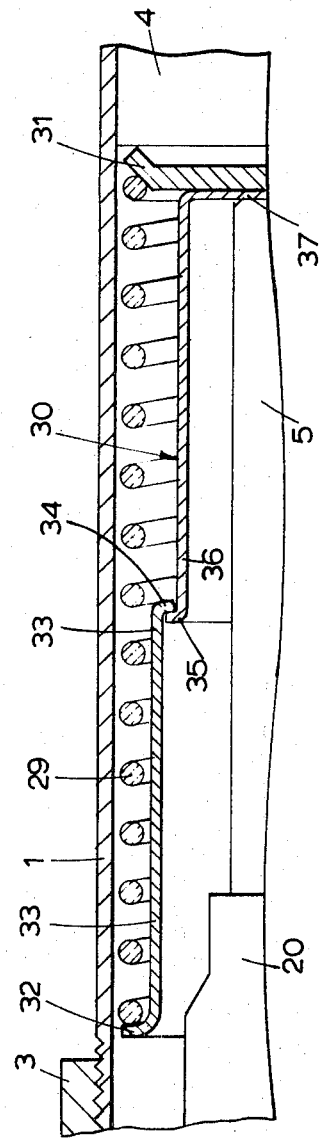
FIG. 2 is a longitudinal section on an enlarged scale of one half of the sub-assembly incorporated in the suspension unit of FIG. 1.

In an hydro-pneumatic suspension unit illustrated in FIGS. 1 & 2 of the accompanying drawings, opposite ends of a cylindrical tube 1 of substantial length are closed by end closures 2 and 3.

A piston adapted to work in the bore of the tube 1 is carried by the upper end of a piston-rod 5 which works through a bore 6 in the end closure 3 and through a low pressure seal 7 located in an annular groove 8. The piston 4 is provided with axial transfer passages therethrough of which at least some may be provided with one-way valves or restrictors to permit and restrict the flow of liquid therebetween in both directions upon relative movement between the piston 4 and the bore and due to differences in pressure. The piston 4 is also provided with a central axial bore (not shown) communicating with axial bore 9 in a spigot extension 10 fixedly secured in the inner end of an axially extending blind bore 11 in the piston rod 5. A radial levelling port 12 provides communication between the inner end of the blind bore 11 and an annular pressure space 13 of variable volume defined between the tube 1, the piston-rod 5, the piston 4 and the end closure 3.

An inlet passage 14 for high pressure liquid from a source, such as a high pressure pump or hydraulic accumulator, is provided in the end closure 3. Communication between the passage 14 and the pressure space 13 is controlled by a valve member 15 in the form of a needle which works in an axial bore 16 in the end closure 3, and has an inner conical end 17 for engagement with a complementary seating 18 between the inner end of the bore 16 and the passage 14. The needle is extremely sensitive in operation since friction is reduced to a minimum.

A portion of the piston-rod 5 terminating at the end closure 3 is guided with a guide-assembly 19 of substantial length. The guide assembly 19 comprises a first cylindrical guide part 20 of which the outer end, which is of reduced diameter, is received in a counterbore 21 in the end closure 3. The inner end of the guide part 20 is formed with an open-ended annular groove 22 in which is received a high pressure seal 23 preferably comprising a one-piece ring of P.T.F.E. The internal diameter of the guide part 20 is increased for an intermediate portion of its length to define with a piston rod 5 an annular drain chamber 24 for connection to a reservoir for liquid. The guide assembly is completed by a second inner guide part 25 which abuts against the inner end of the guide part 20 to retain the high pressure seal 23 in the groove 22 and includes an outwardly extending axial skirt 26 which embraces the outer surface of the guide part 20.

A circlip 27 retained in a groove in the guide part 20 adjacent to the end closure 3 forms a stop limiting axial inward movement of an annular stop plate 28 which prevents movement in an inward direction of the valve member 15 of which the inner end projects into the pressure space 13.

A single compression spring 29 surrounds the inner portion of the piston-rod 5 and acts in a direction to urge the piston 4 towards the end closure 2 after the unit has been extended beyond a predetermined amount. Normally the compression spring 29 is extended and its stressed extended length is accommodated between opposite ends of a telescopic sub-assembly 30, shown in detail in FIG. 2. The sub-assembly 30 comprises an annular reaction plate 31 forming an abutment for one end of the spring 29 and engaging adjacent to its outer peripheral edge with the piston 4. The plate 31 is clamped adjacent to its inner peripheral edge between the piston 4 and the inner end of the piston rod 5. The opposite end of the spring 29 abuts against an outwardly directed radial flange 32 at the outer end of a sleeve 33 of which the inner end is provided with an inwardly directed radial flange 34 engaging with the inner side of a complementary flange 35 at the outer end of a sleeve 36, which side is adjacent to the piston 4. The sleeve 36 is of a diameter less than that of the sleeve 33 and its inner end is provided with an outwardly apertured closure or end wall 37 clamped between the plate 31 and the inner end of the piston rod 5.

The end closure 2 is provided with a connection 38 to a separate pressure chamber (not shown) through an external connection. The pressure chamber comprises a housing divided by a movable wall, such as a diaphragm, into an air or gas chamber and a liquid chamber which is connected to the portion of the tube 1 above the piston 4.

The unit is adapted to be connected between sprung and unsprung parts of a vehicle with the end closure 2 uppermost by means of eyes 39 and 40 provided in the end closure 2 and secured to the free end of the piston rod 5 respectively.

High pressure liquid from the source is admitted to the pressure space 13, past the valve member 15 which is normally spaced from its seating 18. The liquid flows through the radial port 12 and through the bores 11 and 9 to the space in the tube above the piston, and also directly through the axial transfer passages.

The pressure acting on opposite sides of the piston 4 is equal. Thus the piston 4 is moved downwardly to extend the unit since the force acting in that direction and comprising the pressure acting over the full area of the piston is greater than the force acting in the opposite upward direction, normally the same pressure acting over the full are of the piston 4 minus that of the piston-rod 5. This continues until the lower end of the sub-assembly engages with the stop plate 28 to urge the valve member 15 against the seating 18 to cut-off the supply of pressure liquid into the pressure chamber 13. In this position the unit is at a desired predetermined extended length with the levelling port 12 disposed slightly above the high pressure seal 23.

Should the load on the strut be reduced, for example by reducing the loading on the vehicle, the unit will continue to extend due to the effect of liquid pressure acting on the piston 4 against the force in the spring 29 which is progressively compressed, accompanied by a corresponding telescopic movement of the sub-assembly 30. During this movement the port 12 passes through and to the opposite lower side of the seal 23 thereby placing the pressure space 13 and the space above the piston 4 in communication with a reservoir for liquid, through the drain chamber 24. Thus the pressure in the unit is relieved and the desired effective length, when the port 12 is re-positioned below the high pressure seal 23.

If the loading acting on the unit is increased, the unit will contract, permitting the valve member 15 to move away from its seating so that high pressure liquid is again admitted to the pressure space 13. The sequence of operations described above is then repeated.

The rate of the compression spring 29 is chosen so that it is sufficiently strong to hold the valve member 15 against its seating 18 against the pressure of the high pressure liquid, and at the same time permit extension and contraction of the unit in response to suspension deflection. These characteristics are achieved by providing a spring of the maximum diameter which can be accommodated within the tube 1, and including the maximum number of coils which can be accommodated within the length of the sub-assembly 30.

The spring 29, acting through the sub-assembly 30, may be arranged to hold the valve member 15 against its seating 18 after the leveling port 12 has been moved into a position above the high pressure seal 23. This delays the levelling action of the strut after the loading on the vehicle has been increased.

The high pressure seal 23 is the only seal in the unit which is subjected to the full pressure of the liquid from the high pressure source. Constructing the seal 23 from P.T.F.E. reduces to a minimum the friction on the piston rod 5, namely the force with which the seal 23 seals against the piston rod 5 which increases with increase in the pressure of liquid. A slight leakage of liquid may occur past the seal 23 when the liquid pressure is relatively low. This is not critical and is returned to the reservoir through the drain chamber 24. The liquid in the pressure space passes through a flow path defined between the inner end of the guide part 25 and the adjacent end face of the seal to act on the outer peripheral edge of the seal 23 and thereby enhance the force with which it seals against the piston rod 5. This has the additional advantage that, when the port 12 passes over the seal 23, the inner and outer peripheral faces of the seal 23 are subjected to equal pressures. Thus there is no possibility of the seal 23 being damaged by radial displacement of its material into the port 12.

Figure 3:
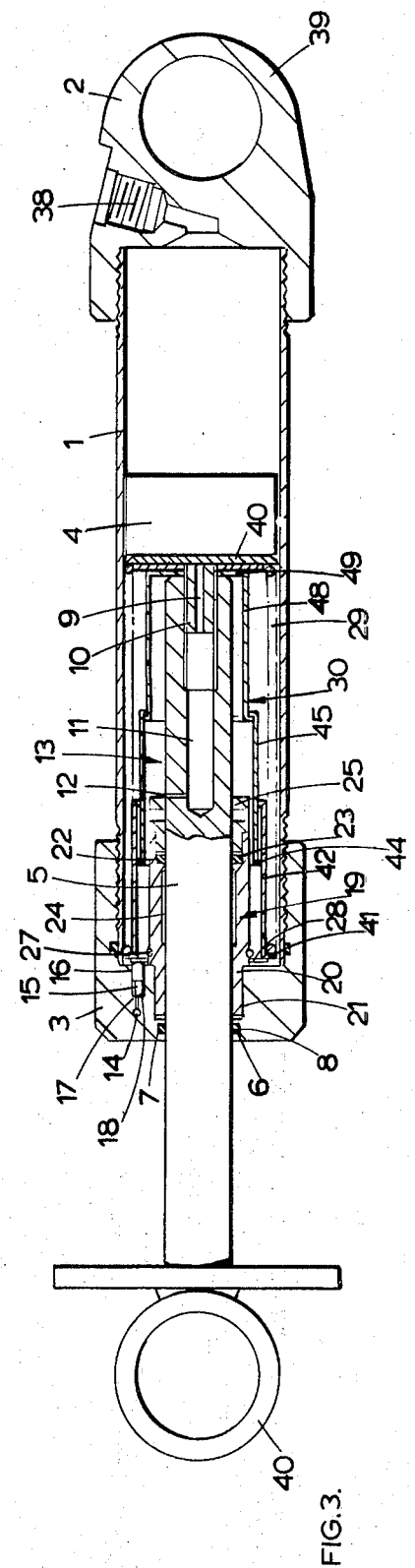
FIG. 3 is a longitudinal section of a suspension unit similar to FIG. 1 but showing a modification.
Figure 4:
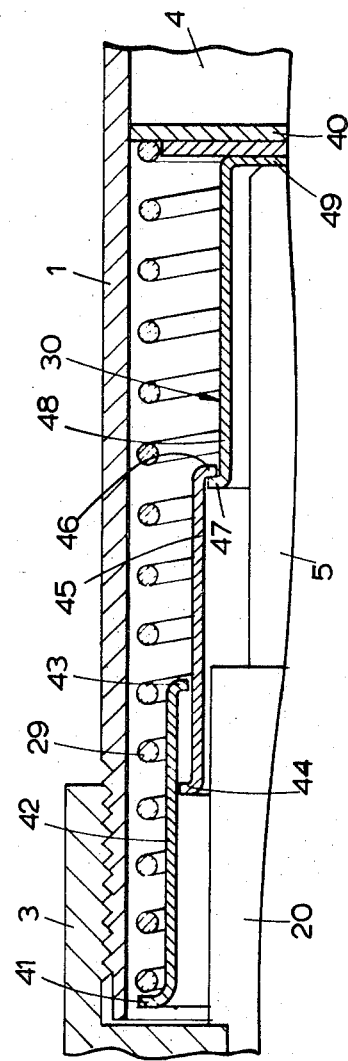
FIG. 4 is a longitudinal section on an enlarged scale of one half of the subassembly incorporated in the suspension unit of FIG. 3.

In the hydro-pneumatic suspension unit illustrated in FIGS. 3 and 4 of the accompanying drawings the telescopic sub-assembly 30 comprises an annular reaction plate 40 forming an abutment for one end of the compression spring 29 and engaging with the piston 4. The plate 40 is clamped between the piston 4 and the inner end of the piston rod 3. The opposite end of the spring 29 abuts against an outwardly directed flange 41 at the outer end of a first outer sleeve 42 of which the inner end is provided with an inwardly direction radial flange 43 superimposed upon and adapted to engage with the side of a complementary flange 44 which extends outwardly and which is located at the outer end of a second inner or intermediate sleeve 45. The inner end of the intermediate sleeve 45 is provided with an inwardly directed radial flange 46 which is superimposed upon and is adapted to abut against a complementary outwardly directed radial flange 47 at the outer end of a third or inner sleeve 48 of which the opposite inner end is formed with an inwardly directed flange 49 clamped between the inner end of the piston rod 5 and the reaction plate 40.

The sub-assembly 30 is movable between a maximum extended length in which the flanges 43 and 44, and the flanges 46 and 47 are in respective abutment and a fully contracted position in which the distance between the reaction plate 40 and the end closure 3 is limited by the length of the outer sleeve 46. Thus, the range of extension and contraction of the unit during which the valve member 15 is held against its seating 18 is increased substantially by the distance between half the length of the telescopic sub-assembly 30 when fully extended, and the length of the sleeve 46.

The construction and operation of the unit is otherwise the same as that described above with reference to FIGS. 1 and 2 of the accompanying drawings and corresponding reference numerals have been applied to corresponding parts.

We claim:

1. An hydro-pneumatic suspension unit of the self-levelling type for a vehicle comprising a cylinder, a closure for one end of said cylinder, a piston-rod assembly defined by a piston adapted to work in said cylinder, and a piston-rod carrying said piston and adapted to work through said closure, a pressure chamber containing gas for supporting a load on the unit, an inlet for connection to a source of high pressure liquid, an inlet valve incorporated in said closure for controlling liquid flow through said inlet into the unit, means for maintaining the effective length of the unit at a predetermined value irrespective of the load, resilient means acting in association with said piston-rod assembly to control operation of said inlet valve, and a collapsible sub-assembly incorporating said resilient means to limit the maximum effective length which said resilient means can attain, said sub-assembly being engageable with said inlet valve to close said inlet valve when the effective length of said unit attains a predetermined extended value, further extension of said unit beyond the said extended value being opposed by said resilient means after collapse of said sub-assembly.

2. An hydro-pneumatic suspension unit as claimed in claim 1, wherein said inlet valve is normally open and is closed by said resilient means when the effective length of the unit attains a predetermined value.

3. An hydro-pneumatic suspension unit as claimed in claim 1, wherein said resilient means comprises a compression spring acting to urge said piston in a direction opposite to that in which said piston is adapted to be urged by liquid under pressure, at least through a limited range, and said sub-assembly with which said spring is combined is of telescopic construction and surrounds said piston-rod, one end of said sub-assembly acting on the face of said piston adjacent to said closure for the said one end of said cylinder, and the other end of said sub-assembly being adapted to act on said closure when the effective length of the unit attains said predetermined value, further movement of said piston towards said closure in the same direction being operative to contract said sub-assembly and compress said spring to close the inlet valve.

4. An hydro-pneumatic suspension unit as claimed in claim 1, wherein said sub-assembly comprises first and second telescopic sleeves and radial flanges at adjacent ends of said sleeves are adapted to abut when said sub-assembly is fully extended.

5. An hydro-pneumatic suspension unit as claimed in claim 1, wherein said sub-assembly comprises at least three telescopic sleeves and radial flanges at adjacent ends of said sleeves are adapted to abut when said sub-assembly is fully extended.

6. An hydro-pneumatic suspension unit as claimed in claim 1, wherein said inlet valve is of the needle type comprising a valve member working in a blind bore in said closure and engageable at its outer end with a seating adjacent to the inner end of said bore which defines said inlet for connection to said source of high pressure liquid the inner end of said valve member projecting into said cylinder and acted on by the end of said sub-assembly remote from said piston when the effective length of the unit attains said predetermined value.

7. An hydro-pneumatic suspension unit as claimed in claim 6, including an annular stop plate through which said sub-assembly acts on said valve member.

8. An hydro-pneumatic suspension unit as claimed in claim 1, wherein said piston rod works through a single seal in said closure for the said one end of the cylinder, and said seal comprises the only seal in the unit adapted to be exposed to the pressure of liquid from the source.

9. An hydro-pneumatic suspension unit as claimed in claim 8, wherein said seal is constructed from P.T.F.E.

10. An hydro-pneumatic suspension unit as claimed in claim 8, wherein said piston rod is provided with a radial port in communication with one end of an axial bore in said rod of which the opposite end communicates with a complementary axial bore passing through said piston, said port being normally positioned to the high pressure side of said seal but, when the unit is extended below the predetermined value and said inlet valve is closed, said port is disposed on the opposite low pressure side of said seal to exhaust the high pressure liquid from the unit thereby restoring the effective length to the predetermined value.

* * * * *